(12) United States Patent
Konno (10) Patent No.: US 7,364,010 B2
(45) Date of Patent: Apr. 29, 2008

(54) EXHAUST SYSTEM FOR A MOTORCYCLE, AND MOTORCYCLE INCLUDING SAME

(75) Inventor: Kenji Konno, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 357 days.

(21) Appl. No.: 11/110,420

(22) Filed: Apr. 20, 2005

(65) Prior Publication Data

US 2005/0236205 A1    Oct. 27, 2005

(30) Foreign Application Priority Data

Apr. 27, 2004    (JP)    .............................. 2004-130794

(51) Int. Cl.
- F01N 7/08 (2006.01)
- F01N 1/16 (2006.01)
- B62D 61/02 (2006.01)
- B60K 13/04 (2006.01)
- F16K 17/00 (2006.01)
- F01N 1/02 (2006.01)
- B62K 11/00 (2006.01)
- B62M 7/00 (2006.01)

(52) U.S. Cl. ...................... 181/228; 181/237; 181/251; 180/296; 180/219

(58) Field of Classification Search ................ 181/237, 181/227, 228, 254, 251; 180/309, 89.2, 296, 180/68.3, 219
See application file for complete search history.

(56) References Cited

U.S. PATENT DOCUMENTS

| | | | |
|---|---|---|---|
| 947,431 A | * | 1/1910 | Ajasson De Grandsagne ... 181/237 |
| 6,247,305 B1 | * | 6/2001 | Bassani ........................ 60/312 |
| 6,325,169 B1 | * | 12/2001 | Tateshima et al. .......... 180/219 |
| 6,662,554 B2 | * | 12/2003 | Sheidler et al. ............... 60/290 |
| 2002/0175022 A1 | * | 11/2002 | Schumacher et al. ....... 181/254 |
| 2003/0079938 A1 | * | 5/2003 | Yamaguchi ................. 181/227 |
| 2003/0121720 A1 | * | 7/2003 | Chang ......................... 181/254 |
| 2005/0224273 A1 | * | 10/2005 | Conte ......................... 180/309 |

FOREIGN PATENT DOCUMENTS

| JP | 03281492 A | * | 12/1991 |
|---|---|---|---|
| JP | 04011593 A | * | 1/1992 |
| JP | 2003-074337 | | 3/2003 |

* cited by examiner

*Primary Examiner*—Edgardo San Martin
(74) *Attorney, Agent, or Firm*—Carrier, Blackman & Associates, P.C.; William D. Blackman; Joseph P. Carrier (57) ABSTRACT

A motorcycle, having both left and right mufflers, has an exhaust structure which enables an increase in the allowable margin through which the rear wheel is permitted to rise. A main exhaust pipe extends from an engine to one side of a shock absorber disposed on the rear side of the engine. The main exhaust pipe is branched in the vicinity of the shock absorber into a first branch pipe and a second branch pipe. The first branch pipe is connected to a first muffler disposed on the same side as the main exhaust pipe, and the second branch pipe is connected to a second muffler after passing between the shock absorber and a rear wheel to the opposed side of the vehicle body. The second branch pipe does not interfere with the rising motion of the rear wheel, and a sufficient allowable margin is secured for the rear wheel.

20 Claims, 6 Drawing Sheets

EXHAUST SYSTEM FOR A MOTORCYCLE, AND MOTORCYCLE INCLUDING SAME

CROSS-REFERENCE TO RELATED APPLICATIONS

The present invention claims priority under 35 USC 119 based on Japanese patent application No. 2004-130794, filed on Apr. 27, 2004. The subject matter of this priority document is incorporated by reference herein.

BACKGROUND OF THE INVENTION

1. Field of the Invention

The present invention relates to an improvement in an exhaust system for a motorcycle.

2. Background of the Invention

A wide variety of layout configurations have been proposed for the muffler and exhaust pipe in an exhaust system of a motorcycle. An example of an exhaust system configuration is disclosed in Japanese Patent Laid-open No. 2003-74337 (FIGS. 3 and 4).

FIG. 3 of Japanese Patent Laid-open No. 2003-74337 shows an exhaust pipe 18. The exhaust pipe 18 is composed of an exhaust pipe front portion 61, a right side connecting pipe 62 extending rearwards from the exhaust pipe front portion 61 and connected to a muffler 23 disposed on the right side, and a coupling pipe 63 for connecting the right side connecting pipe 62 with a muffler 22 disposed on the left side (refer to paragraph [0015] of Japanese Patent Laid-open No. 2003-74337). The coupling pipe 63 extends crosswise directly above the rear wheel, as indicated by imaginary lines.

FIG. 4 of Japanese Patent Laid-open No. 2003-74337 is a side view of the exhaust system of FIG. 3, in which the coupling pipe 63 passes below tandem seat 43 at a position which is spaced a vertical distance C from the bottom of a sunken portion 43c of a tandem seat 43. Therefore, the allowable margin through which the rear wheel 21 is permitted to rise is determined by the height of the underside of the coupling pipe 63, as indicated by an imaginary line 82.

Meanwhile, in motorcycles such as off-road vehicles and trial vehicles, the suspension of rear wheel is required to accommodate a large degree of contraction/expansion during navigation of rugged operation terrain. Therefore, the exhaust pipe structure shown in Japanese Patent Laid-open No. 2003-74337 is not suitable for these types of motorcycles, since the allowable margin through which the rear wheel 21 is permitted to rise is too small.

However, in connection with motorcycles equipped with left and right mufflers, there is a keen demand for an exhaust pipe structure which enables an increase in the allowable margin through which the rear wheel is permitted to rise.

SUMMARY OF THE INVENTION

It is an object of the present invention to provide an exhaust pipe structure which enables an increase in the allowable margin through which the rear wheel is permitted to rise, in a motorcycle equipped with left and right mufflers.

A first aspect of the invention resides in an exhaust system for a motorcycle. The exhaust system includes a first muffler and a second muffler disposed respectively on the upper left and right sides of a rear wheel, and an exhaust pipe extending from an engine and connected to the mufflers. The invention is characterized in that the exhaust pipe extends from the engine to the left or right side of a shock absorber disposed on the rear side of the engine in the vicinity of the center of a vehicle body. The exhaust pipe is branched in the vicinity of the shock absorber into a first exhaust branch pipe and a second exhaust branch pipe. The first exhaust branch pipe is connected to the first muffler, which is disposed on the same side of the vehicle as the exhaust pipe. The second exhaust branch pipe is connected to the second muffler after passing between the shock absorber and the rear wheel, the rear wheel being disposed on the rear side of the shock absorber. The second exhaust pipe extends crosswise from one of the left and right sides of the vehicle body to the other of the left and right sides of the vehicle body.

A second aspect of the invention resides in an exhaust system for a motorcycle comprising a first muffler and a second muffler disposed respectively on the upper left and right sides of a rear wheel, and an exhaust pipe extending from an engine and connected to the mufflers. The invention is characterized in that the exhaust pipe is branched into a first exhaust branch pipe and a second exhaust branch pipe after extending in the front-rear direction on one side of a vehicle body. The first exhaust branch pipe is connected to the first muffler, which is disposed on the same side of the vehicle as the exhaust pipe, whereas the second exhaust branch pipe is connected to the second muffler after extending crosswise from one of the left and right sides of the vehicle body to the other of the left and right sides of the vehicle body. The second exhaust branch pipe extends in the direction of the exhaust gas flow within the exhaust pipe prior to the branched portion. The first exhaust branch pipe extends in a direction which intersects the exhaust gas flow within the exhaust pipe prior to branching.

A third aspect of the invention is characterized in that a branched portion is provided for branching the exhaust pipe into the first exhaust branch pipe and the second exhaust branch pipe. The branched portion is comprised of an integrally formed first pipe, and a second pipe. The second pipe has a tip end connected to a wall of the first pipe. The second pipe is on the side of the first exhaust branch pipe, and the first pipe is on the side of the second exhaust branch pipe.

A fourth aspect of the invention is characterized in that the first exhaust branch pipe is smaller in diameter than the second exhaust branch pipe.

A fifth aspect of the invention is characterized in that an air cleaner case is disposed between the shock absorber and the rear wheel, and is positioned on the upper side relative to the second exhaust branch pipe. A cleaner element contained in the air cleaner case is disposed so that the longitudinal direction thereof extends in the vehicle width direction.

A sixth aspect of the invention is characterized in that an exhaust valve is interposed in the branched portion. The exhaust valve is configured so that when the quantity of the exhaust gas flowing through the exhaust pipe is small, a valve body advances into the exhaust pipe to throttle the flow passages of the first exhaust branch pipe and the second exhaust branch pipe. Further, when the quantity of the exhaust gas is large, the valve body recedes to cancel the throttling.

According to the first aspect of the invention, the exhaust pipe extends from the engine to the left or right side of the shock absorber, the shock absorber disposed in the vicinity of the center of the vehicle body on the rear side of the engine. In the vicinity of the shock absorber, the exhaust pipe is branched into the first exhaust branch pipe and the second exhaust branch pipe. The first exhaust branch pipe is connected to the first muffler, the first muffler being disposed on the same side of the vehicle as the exhaust pipe. The second exhaust branch pipe passes between the shock absorber and the rear wheel, extends crosswise from one of the left and right sides of the vehicle body to the other of the left and right sides of the vehicle body, and is then connected to the second muffler.

Namely, the second exhaust branch pipe, which extends crosswise in the vehicle body width direction, passes between the shock absorber and the rear wheel, so that the second exhaust branch pipe does not hamper the rising of the rear wheel. As a result, it is possible to sufficiently secure the desired allowable margin through which the rear wheel is permitted to rise. The first aspect of the invention can provide an exhaust system which enables an increase in the allowable margin through which the rear wheel is permitted to rise, in a motorcycle equipped with left and right mufflers.

According to the second aspect of the invention, the exhaust pipe branches into the first exhaust branch pipe and the second exhaust branch pipe after extending in the front-rear direction on one side of the vehicle body. The first exhaust branch pipe is connected to the first muffler, which is disposed on the same side of the vehicle as the exhaust pipe. The second exhaust branch pipe is connected to the second muffler after extending crosswise from one of the left and right sides of the vehicle body to the other of the left and right sides of the vehicle body. The second exhaust branch pipe extends in a direction generally aligned with the exhaust gas flow within the exhaust pipe prior to the branched portion, and the first exhaust branch pipe extends in a direction which intersects the exhaust gas flow in the exhaust pipe prior to the branched portion.

Since the second exhaust branch pipe extends crosswise in the vehicle body width direction, the second exhaust branch pipe is liable to be longer than the first exhaust branch pipe, and thus a difference in exhaust gas flow is liable to be generated between the first exhaust branch pipe and the second exhaust branch pipe. However, it is desirable for the pipe resistance be the same in both the branch pipes. In view of this, the longer second exhaust branch pipe is arranged to extend in the direction of the exhaust gas flow within the exhaust pipe prior to the branched portion, thereby making it easy for the exhaust gas to flow therethrough. In contrast, the shorter first exhaust branch pipe extends in a direction which intersects the exhaust gas flow in the exhaust pipe prior to the branched portion, thereby making it difficult for the exhaust gas to flow therethrough. As a result, the exhaust gas flows in the first exhaust branch pipe and in the second exhaust branch pipe are equalized.

According to the third aspect of the invention, the branched portion which branches the exhaust pipe into the first exhaust branch pipe and the second exhaust branch pipe is composed of the integrally formed first pipe, and the second pipe having the tip end thereof connected to a wall of the first pipe. The second exhaust branch pipe extends in the direction of the exhaust gas flow in the exhaust pipe prior to the branched portion, and is connected to an integrally formed first pipe outlet, whereas the first exhaust branch pipe extends in a direction which intersects the exhaust gas flow in the exhaust pipe prior to the branch portion, and is connected to a second pipe outlet. The branching portion is easily configured, and is smoothly connected to the first exhaust branch pipe and the second exhaust branch pipe.

According to the fourth aspect of the invention, the first exhaust branch pipe is smaller in diameter than the second exhaust branch pipe. Specifically, the shorter first exhaust branch pipe is made to be smaller in diameter, thereby making it more difficult for the exhaust gas to flow therethrough, whereas the longer second exhaust branch pipe is made to be larger in diameter, thereby making it easier for the exhaust gas to flow therethrough, As a result, equalization of the exhaust gas flows in both the exhaust branch pipes is more easily achieved.

According to the fifth aspect of the invention, the air cleaner case is disposed between the shock absorber and the rear wheel, and is positioned on the upper side relative to the second exhaust branch pipe. The cleaner element contained in the air cleaner case is disposed so that the longitudinal direction thereof extends in the vehicle width direction.

In many conventional motorcycles, the cleaner element is disposed in a vertically elongate mode in which the longitudinal direction of the cleaner element is substantially along the vertical axis.

In contrast, in the inventive exhaust system configuration, the cleaner element is disposed so that its longitudinal direction extends in the vehicle width direction, and the cleaner case is disposed in a horizontally elongate mode. As a result, a space is obtained between the cleaner case and the swing arm, and the second exhaust branch pipe is successfully passed through the space thus secured.

According to the sixth aspect of the invention, the exhaust valve is interposed in the branching portion. At the time of low exhaust output such as when the engine speed is low, the back pressure in the exhaust pipe is appropriately raised by the throttling action of the valve body, making it possible to enhance the engine performance. At the time of high exhaust output such as when the engine speed is high, the cross-sectional area of the exhaust pipe is maximized, whereby the back pressure is appropriately lowered, making it possible to enhance the engine performance.

In addition, notwithstanding the two mufflers, consisting of the first muffler and the second muffler, are provided and the first exhaust branch pipe and the second exhaust branch pipe are coupled respectively to these mufflers, the arrangement of the exhaust valve in the branching portion makes it possible to regulate the exhaust gas pressures collectively using the single exhaust valve. Thus, the number of the valve(s) is minimized, and a reduction in the number of component parts is obtained.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 6(*a*) shows an example of an exhaust valve disposed in the exhaust pipe at a position corresponding to a low engine speed.

FIG. 6(*b*) shows an example of an exhaust valve disposed in the exhaust pipe at a position corresponding to a high engine speed.

DETAILED DESCRIPTION OF THE INVENTION

A best mode for carrying out the present invention will be described below, based on the accompanying drawings. In the description provided below, references to front, rear, left and right correspond to the normal operating orientation of the vehicle. L is a suffix indicating the left as viewed from the driver, R is a suffix indicating the right as viewed from the driver, which are affixed as required, here and hereinafter.

Figure 1:
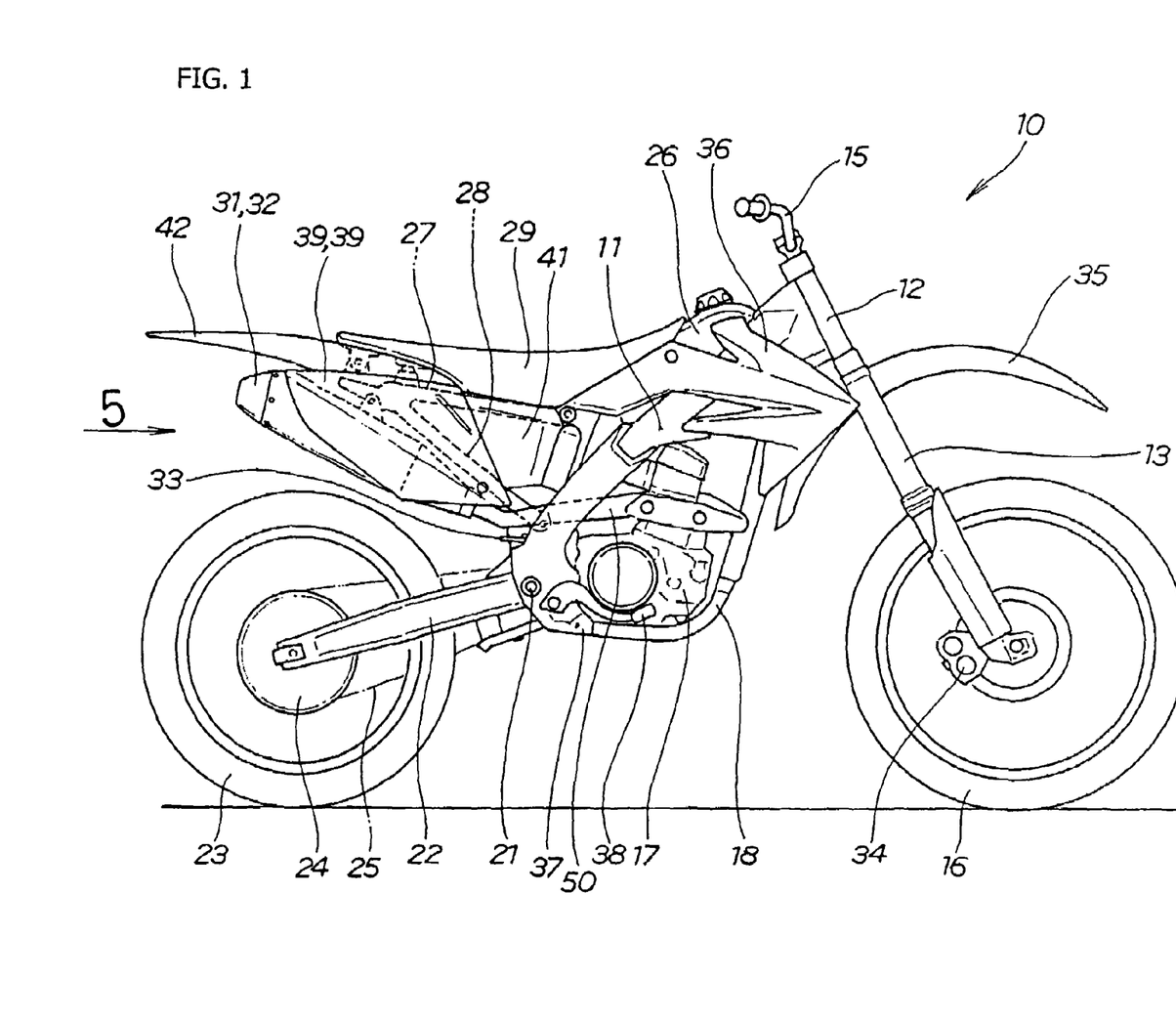
FIG. 1 is a side view of a motorcycle according to the present invention, showing an exhaust system disposed on a rear portion of the vehicle.

FIG. 1 is a side view of a motorcycle 10 according to the present invention. The motorcycle 10 is an off-road-type motorcycle. The motorcycle 10 has a structure in which a front fork 13 is steerably mounted to a head pipe 12 provided at a front portion of a main frame 11, a steering handle 15 is mounted to the upper end of the front fork 13, and a front wheel 16 is rotatably mounted to the lower ends of the front fork 13. The motorcycle 10 includes a single-cylinder engine 17 suspended from the main frame 11. The engine 17 is surrounded by a down tube 18 extended downwards from a front portion of the main frame 11. The rear end of the down tube 18 is connected to a rear portion of the main frame 11, a swing arm 22 is vertically swingably mounted to a rear portion of the main frame 11 through a pivot 21, and a rear wheel 23 is rotatably mounted to the rear end of the swing arm 22. The motorcycle 10 further includes a chain 25 for transmitting the power of the engine 17. The chain 25 is wound around a sprocket 24 belonging to the rear wheel 23. A fuel tank 26 is mounted to a front portion of the main frame 11. Seat rails 27 extend from rear upper portions of the main frame 11, the seat rails 27 are reinforced by slant sub-stays 28, and a seat 29 is mounted on the seat rails 27. A first muffler 31 and a second muffler 32 (one of them is located in the depth of the drawing) are disposed along the sub-stays 28, and a shock absorber 33 for controlling the swinging motions of the swing arm 22 is disposed on the front side (the right side in the figure) of the mufflers 31, 32. An exhaust pipe extends from the engine 17, and the details thereof will be described later.

The motorcycle 10 includes a front brake caliper 34, a front fender 35, a cowl 36, step bars 37 on which to mount the driver's feet, a brake pedal 38, protectors 39, 39 annexed to the mufflers 31, 32, side covers 41, and a rear fender 42.

Figure 2:
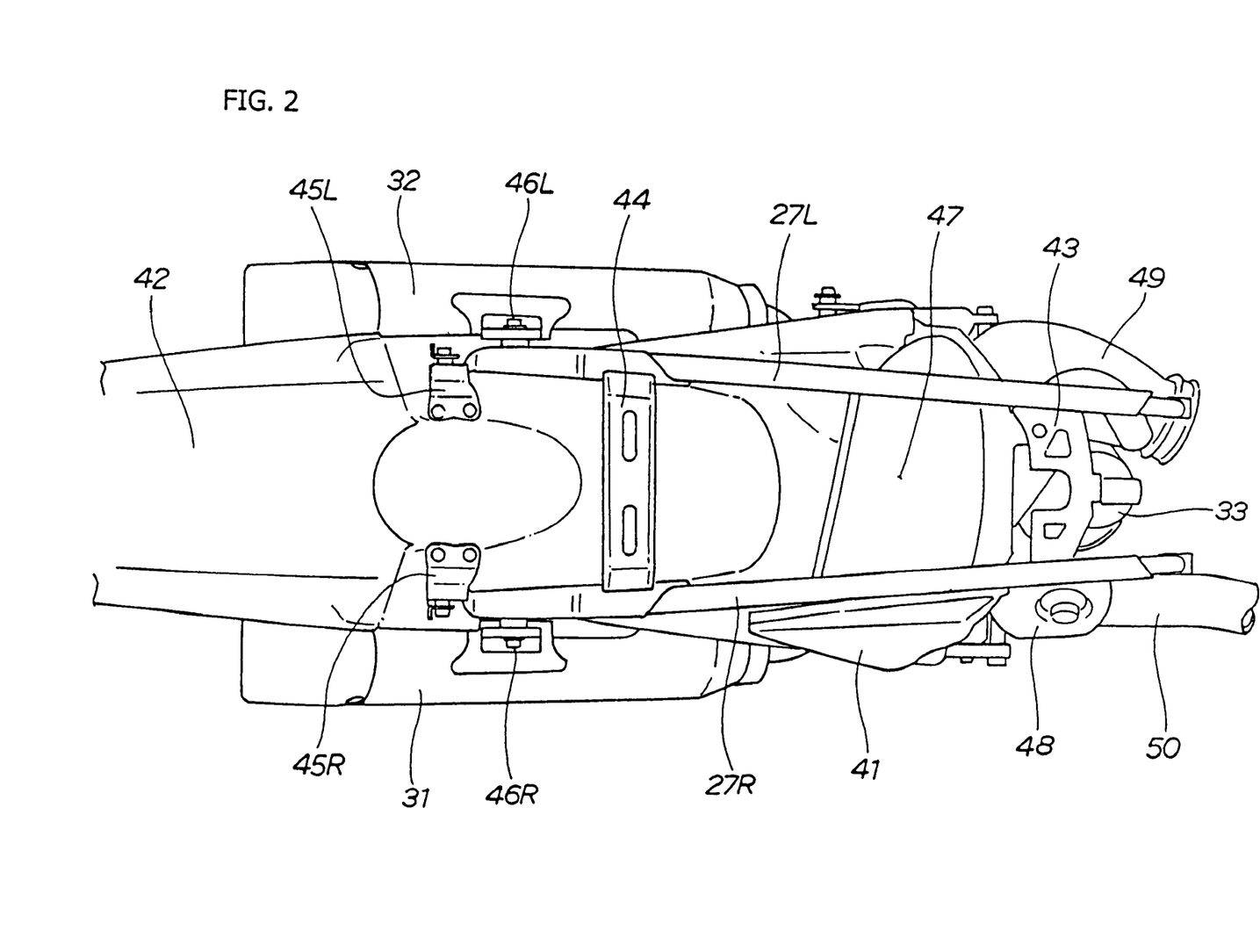
FIG. 2 is a plan view of the rear portion of the motorcycle according to the present invention.

FIG. 2 is a top plan view of the rear portion of the motorcycle according to the present invention, and shows that, for connecting an upper portion of the shock absorber 33, a cross member 43 is bridgingly disposed between front portions of left and right seat rails 27L, 27R. A cross member 44, which also functions as a reinforcement member, is bridgingly disposed between intermediate portions of the seat rails 27L, 27R, and brackets 45L, 45R are erected from rear portions of the seat rails 27L, 27R for the purpose of bearing a rear portion of the seat. The rear fender 42 is positioned between the brackets 45L and 45R and on the under side thereof (in the depth of the drawing). The first muffler 31 and the second muffler 32 are disposed on the left and right sides of the rear fender 42.

The first muffler 31 and the second muffler 32 are detachably attached to the rear portions of the seat rails 27L, 27R by bolts 46L, 46R.

In the figure, symbol 48 denotes an exhaust pipe support portion, 47 denotes an air cleaner case disposed between the shock absorber 33 and the rear wheel, 49 denotes an air duct portion extending from the air cleaner case 47 to the engine, and a flexible connecting tube can be connected to the air duct portion 49.

Figure 3:
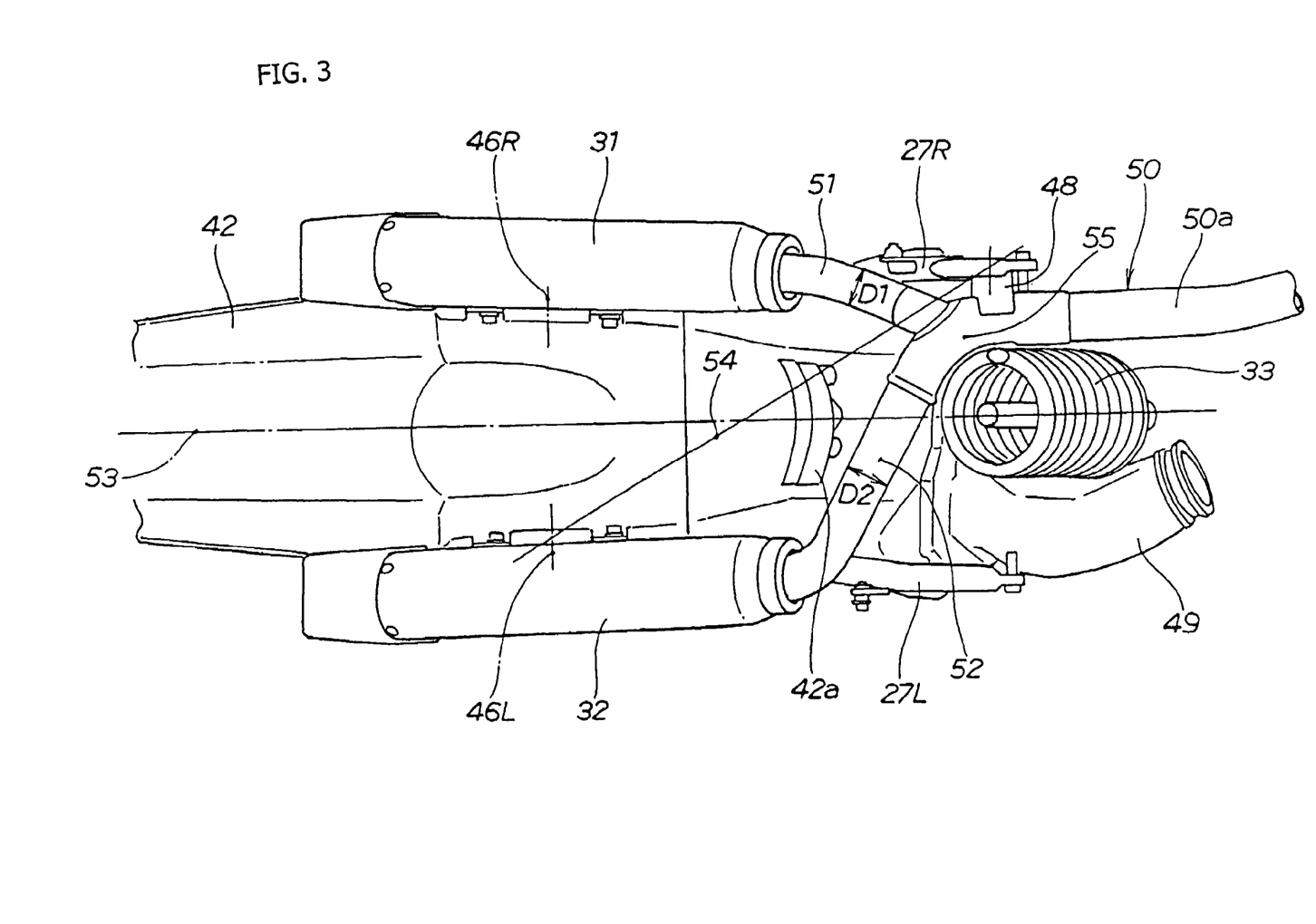
FIG. 3 is a bottom view of the rear portion of the motorcycle of FIG. 2 according to the present invention with the rear wheel omitted, showing a muffler positioned on each lateral side of the motorcycle, and the branched exhaust pipe.

FIG. 3 is a bottom view of FIG. 2 in which the rear wheel is omitted, and shows a structure characterized in that an exhaust pipe 50 extending from the engine (symbol 17 in FIG. 1) extends to the left or right side of the shock absorber 33. Note that in the figure, the upper side is the right side, and the lower side is the left side. The shock absorber 33 is disposed on the rear side of the engine in the vicinity of the center of the vehicle body. The exhaust pipe 50 is branched in the vicinity of the shock absorber 33 into a first exhaust branch pipe 51 and a second exhaust branch pipe 52. The first exhaust branch pipe 51 is connected to the first muffler 31. The first muffler 31 is disposed on the same side of the vehicle as the exhaust pipe 50, whereas the second exhaust branch pipe 52 is connected to the second muffler 32 after passing between the shock absorber 33 and the rear wheel (symbol 23 in FIG. 1). The rear wheel is positioned on the rear side of the shock absorber 33. The second exhaust branch pipe 52 extends crosswise from one of the left and right sides of the vehicle body to the other of the left and right sides of the vehicle body. In the illustrated embodiment of FIG. 3, the second exhaust branch pipe extends crosswise from the right side to the left side. Incidentally, when it is necessary to section the exhaust pipe 50, a front portion thereof will be referred to as an exhaust pipe front portion 50*a*. In addition, a rear fender front portion is provided at the front of fender 42 (see FIG. 5).

Preferably, the second exhaust branch pipe 52 extends in the direction of the exhaust gas flow in the exhaust pipe 50 prior to the branched portion (the exhaust pipe front portion 50*a*). On the other hand, the first exhaust branch pipe 51 extends in a direction which intersects the exhaust gas flow in the exhaust pipe 50 prior to the branched portion (the exhaust pipe front portion 50*a*).

Since the second exhaust branch pipe 52 extends crosswise in the vehicle body width direction, it tends to be longer than the first exhaust branch pipe 51. Thus, a difference in exhaust gas flow is liable to be generated between the first exhaust branch pipe 51 and the second exhaust branch pipe 52. It is desired that the pipe resistance be the same in both the exhaust branch pipes 51, 52. In view of this, the longer second exhaust branch pipe 52 extends in the direction of the exhaust gas flow in the exhaust pipe 50 prior to the branched portion, thereby making it easy for the exhaust gas to flow therethrough, whereas the shorter first exhaust branch pipe 51 extends in a direction which intersects the exhaust gas flow in the exhaust pipe 50 prior to the branched portion, thereby making it difficult for the exhaust gas to flow therethrough. As a result, the exhaust gas flows in the first exhaust branch pipe 51 and in the second exhaust branch pipe 52 are equalized.

Furthermore, the first exhaust branch pipe 51 is made to be smaller in diameter than the second exhaust branch pipe 52. Namely, the condition of $D1<D2$ is set, where $D1$ is the inside diameter of the first exhaust branch pipe 51, and $D2$ is the inside diameter of the second exhaust branch pipe 52. The shorter first exhaust branch pipe 51 is made to be smaller in diameter, thereby making it difficult for the exhaust gas to flow therethrough, and the longer second exhaust branch pipe 52 is made to be larger in diameter, thereby making it easy for the exhaust gas to flow therethrough, whereby the exhaust gas flows in both the exhaust branch pipes 51, 52 are more easily equalized.

Meanwhile, if the exhaust pipe 50, including the first exhaust branch pipe 51 and the second exhaust branch pipe 52, is short, the support rigidity thereof is secured by supporting its front end with the exhaust pipe of the engine and supporting its rear end with the mufflers 31, 32. In the present invention, however, the second exhaust branch pipe 52 extends across the vehicle body in the left-right direction, so that as a whole it is long and heavy. Therefore, an increased number of support points are provided for the second exhaust branch pipe 52.

Since the first exhaust branch pipe 51 is short, is light, and is located on the same side (with reference to the vehicle body center line 53) as the exhaust pipe 50, it does not have such an influence as a twisting force on the exhaust pipe 50.

On the other hand, since the second exhaust branch pipe 52 is long, is heavy, and is located on the opposed side (with respect to the vehicle body center line 53) relative to the exhaust pipe 50, it applies a twisting force on the exhaust pipe 50.

Since the second muffler 32 is one of the support points for the second exhaust branch pipe 52, an additional support point for the second exhaust branch includes the exhaust pipe support portion 48. The exhaust pipe support portion is arranged on the opposed side relative to the second muffler 32, and is effective for compensating for the twisting force applied by the second exhaust branch pipe 52.

To accommodate the weight and length of the second exhaust branch pipe 52, it is effective to support the second exhaust branch pipe 52 at two points, for example, at both ends. The two support points consist of the exhaust pipe support portion 48 and the support point (the bolt 46L) for the second muffler 32.

As seen in FIG. 3, a slant line 54 can be formed which passes through the support point (the bolt 46L) for the second muffler 32, intersects the vehicle body center line 53, and which passes in the vicinity of the branched portion 55. From the foregoing, the provision of the exhaust pipe support portion 48 at a position which is on the slant line 54 makes it possible to minimize the number of additional support point(s) and to obtain a maximum effect.

Figure 4:
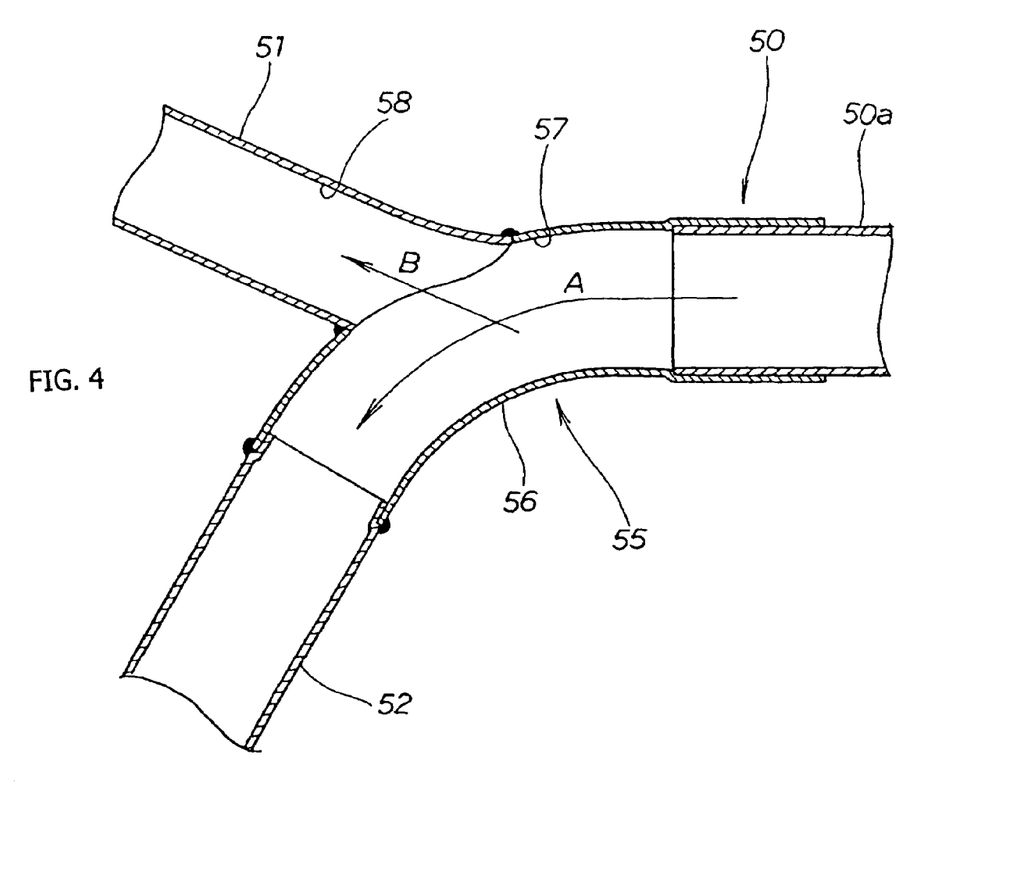
FIG. 4 is an enlarged sectional view of a branched portion of an exhaust pipe according to the present invention.

FIG. 4 is an enlarged sectional view of the branched portion 55 of the exhaust pipe 50 in the present invention. The branched portion 55 permits branching of the exhaust pipe 50 into the first exhaust branch pipe 51 and the second exhaust branch pipe 52, and is preferably composed of a first pipe 56 integrally formed in a curved pipe shape, and a second pipe 58. The tip end or terminal end of the second pipe 58 is coupled to a large diameter side wall 57 of the first pipe 56. That is, the tip end of the second pipe 58 is coupled to the outer, convex side of the curved first pipe 56.

As a result, the second exhaust branch pipe 52 is generally aligned with the direction (arrow A) of the exhaust gas flow within the exhaust pipe 50 prior to the branched portion. For example, the second exhaust branch pipe 52 is generally aligned with the direction of the gas flow within the exhaust pipe front portion 50a. The second exhaust branch pipe 52 is connected to an outlet of the integrally formed first pipe 56. The first exhaust branch pipe 51 extends in a direction (arrow B) which intersects the exhaust gas flow in the exhaust pipe 50 prior to branching. For example, the first exhaust branch pipe 51 extends in a direction which intersects at some angle the exhaust gas flow in the exhaust pipe front portion 50a. The first exhaust branch pipe 51 and is connected to an outlet of the second pipe 58.

The branching portion 55 is easily configured, and the first exhaust branch pipe 51 and the second exhaust branch pipe 52 are smoothly coupled thereto.

The air cleaner will now be described.

Figure 5:
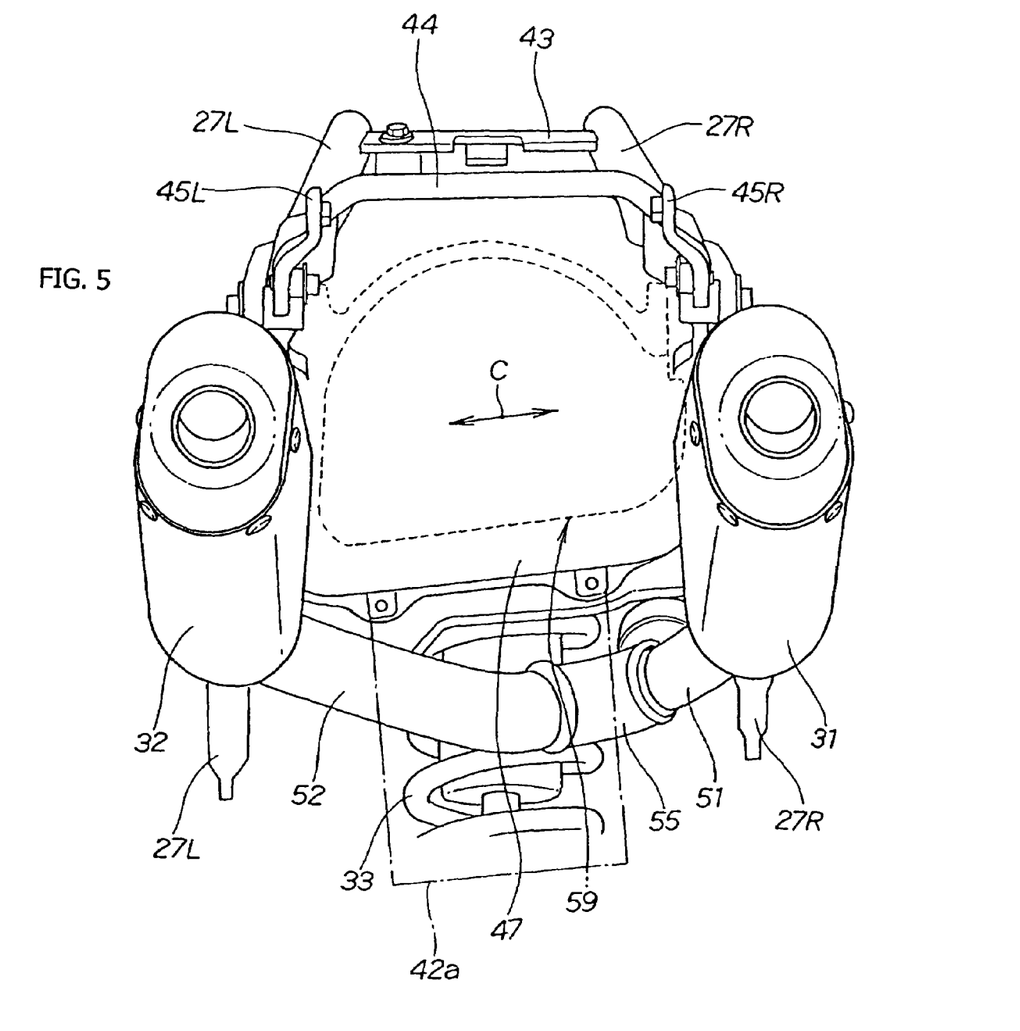
FIG. 5 is a rear view of the exhaust system as seen along arrow 5 of FIG. 1 in which the rear wheel, the rear fender and the like are omitted.

FIG. 5 is a rear side view of the motorcycle as seen along arrow 5 of FIG. 1, and shows a structure characterized in that the air cleaner case 47 is disposed on the viewer's side of the drawing of the shock absorber 33 (between the shock absorber 33 and the rear wheel). Moreover, the air cleaner case is disposed on the upper side relative to the second exhaust branch pipe 52. A cleaner element 59, contained in the air cleaner case 47, is disposed so that its longitudinal direction (arrow C) extends in the vehicle width direction. As seen in phantom in FIG. 5, a rear fender front portion 42a extends downwards from the air cleaner case 47.

In many cases, conventional motorcycles include air cleaners in which the cleaner element has been disposed in a vertically elongate mode such that its longitudinal direction is substantially along the vertical direction.

However, in the present invention, the cleaner element 59 is so disposed that its longitudinal direction (arrow C) extends in the vehicle width direction, and the air cleaner case 47 is disposed in a horizontally elongate mode. As a result, a vacant space is secured between the air cleaner case 47 and the swing arm, and the second exhaust branch pipe 52 easily passes through the vacant space thus secured.

Figure 6A:
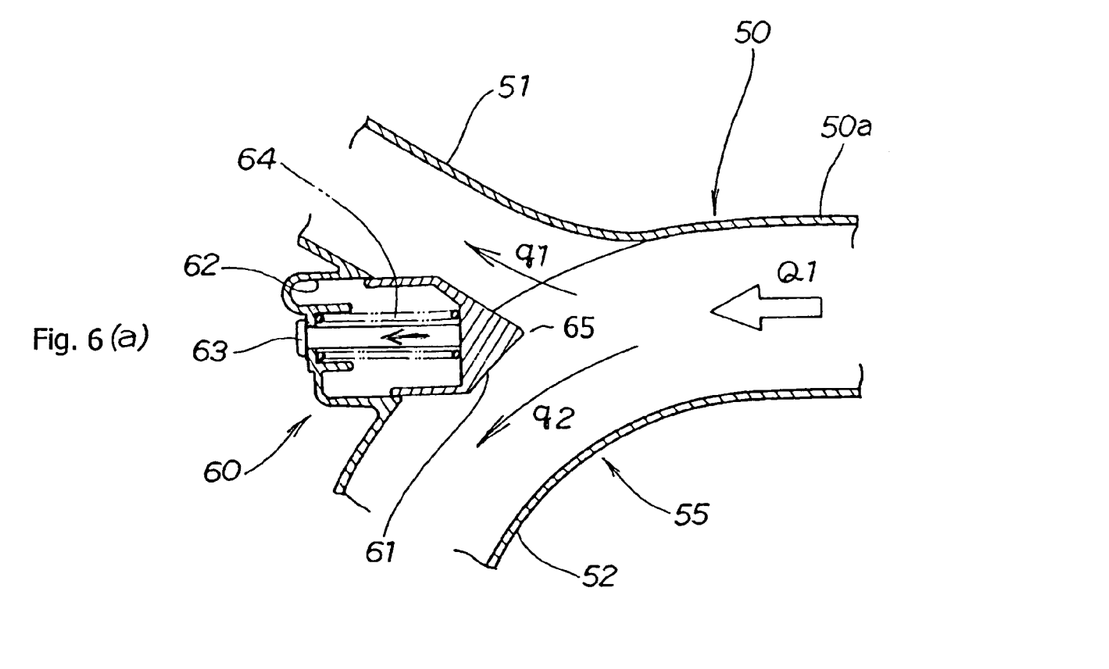
Figure 6B:
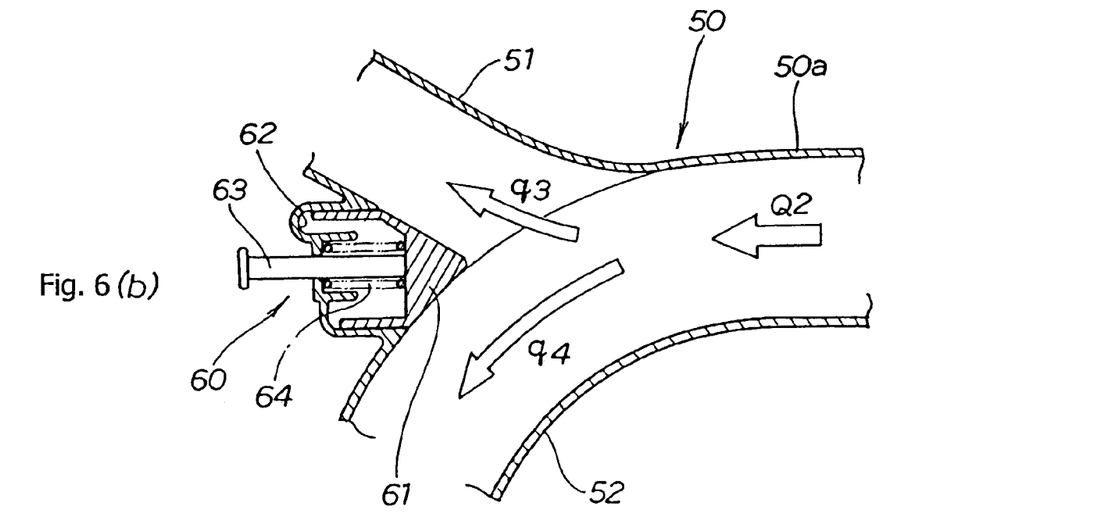

FIGS. 6(*a*) and 6(*b*) show an exhaust valve 60 disposed in the exhaust pipe according to a selected illustrative embodiment of the present invention. The exhaust valve 60 includes a slidably movable valve body 61 having a tip 65 sharpened in an arrow-like shape. Those in the art will realize that this substantially pointed shape of the valve body tip 65 helps to smoothly bifurcate the exhaust stream, and to reduce or minimize turbulence in the exhaust flow caused by the presence of the valve body 61. The exhaust valve 60 also includes a pocket portion 62 formed in the wall of the exhaust pipe 50 at the junction of the two branches 51, 52 by enlarging the inner apex region of the branched portion 55, for the purpose of movably containing the valve body 61 therein. The valve body 61 includes a distal end at the tip 65 thereof, and a proximal or base end opposite the distal end, where the proximal end is in sliding contact with an inner wall of the pocket portion. The exhaust valve 60 also includes a valve rod 63 which extends from the valve body 61 through the pocket portion 62, and a spring 64 which surrounds the valve rod 63, and which biases the valve body 61 towards the inside of the exhaust pipe 50. As shown in FIGS. 6(*a*)-6(*b*), the valve rod 63 includes an enlarged head which extends outside of the exhaust pipe 50, and which functions as a stop member to limit movement of the valve body 61 into the exhaust pipe 50. It will be noted that due to this limit on the movement of the valve body 61 into the interior of the exhaust pipe 50, at the fully advanced, most intrusive position of the valve body 61 shown in FIG. 6(*b*), when the head of the valve rod 63 is in contact with the exterior of the exhaust pipe 50, the valve body 61 obstructs less than half of the pipe diameter, and the proximal end of the valve body remains inside of the pocket portion.

In FIG. 6(*a*), when the engine speed is low, the quantity Q1 of the exhaust gas generated in the engine is small. When the quantity Q1 of the exhaust gas is small, the force of the exhaust gas flow pushing the valve body 61 against the spring 64 is small, so that the valve body 61 advances largely into the inside of the exhaust pipe 50, whereby the first exhaust branch pipe 51 and the second exhaust branch pipe 52 are throttled, and the quantities q1 and q2 of the exhaust gas flowing through the respective exhaust branch pipes are reduced.

When viewed from the engine side, at the time of low exhaust output when the engine speed is low, the back pressure in the exhaust pipe 50 is appropriately raised by the throttling action of the valve body 61, whereby the engine performance is enhanced.

In FIG. 6(b), when the engine speed is high, the quantity Q2 of the exhaust gas generated in the engine is large. When the quantity Q2 of the exhaust gas is large, the force of the exhaust gas flow pushing the valve body 61 against the spring 64 is large, so that the valve body 61 recedes into the pocket portion 62, whereby the quantities q3 and q4 of the exhaust gas flowing through the respective first exhaust branch pipe 51 and the second exhaust branch pipe 52 are enlarged.

When viewed from the engine side, at the time of high exhaust output when the engine speed is high, the cross-sectional area of the exhaust pipe 50 is maximized, whereby the back pressure is appropriately lowered, and the engine performance is enhanced.

In short, with the exhaust valve provided as a throttle valve, and with the exhaust passage is throttled at the time of low engine speed, a characteristic suited to the low engine speed time can be obtained. Therefore, when the exhaust valve is opened, a characteristic suited to the high engine speed time can be obtained, i.e., the exhaust branch pipes can be set short, so that the mufflers can be disposed close to the center of gravity which is near the vehicle body front side.

Now, the present invention will be evaluated below from other points of view.

In motorcycles such as off-road motorcycles in which the handling of the vehicle body is enhanced by reductions in size and weight, it was considered to be common sense that the motorcycle is equipped with a single-cylinder engine, a single exhaust pipe, and a single muffler.

Since it is difficult to dispose the single muffler on the vehicle body center axis, the muffler is conventionally disposed on the right or left side of the rear wheel. The muffler is a heavy body which cannot be ignored in a small-type vehicle, and, therefore, the muffler exerts an unbalanced load on the vehicle body. Conventionally, the unbalanced load has been compensated for by the skill of the driver.

In this point, according to the present invention, the motorcycle such as an off-road motorcycle has a structure in which the single-cylinder engine is equipped with the left and right mufflers. The left and right mufflers can be disposed symmetrically with respect to the vehicle body center axis, so that the left-right balance of the vehicle body is enhanced. Since no unbalanced load is exerted on the vehicle body, it is unnecessary for the driver to compensate for such an unbalance by his skill, so that ease of operation of the motorcycle is improved.

In addition, by providing a longer exhaust pipe during operation at low engine speeds, engine performance is enhanced. It is known that the engine performance can be enhanced by making the exhaust pipe shorter during operation at high engine speeds.

In FIG. 3, during operation at low engine speeds, the pressure of the exhaust gas is lowered, so that a larger quantity of the exhaust gas flows through the second exhaust branch pipe 52, in which it is easier for the exhaust gas to flow, than through the first exhaust branch pipe 51. The sufficiently long second exhaust branch pipe 52 functions to improve the engine performance.

During operation at high engine speeds, the back pressure of the exhaust gas is raised, the exhaust gas flows both through the first exhaust branch pipe 51 in which it is difficult for the exhaust gas to flow, and through the second exhaust branch pipe 52. Because exhaust gas flows through the first exhaust branch pipe 51, and because the first exhaust branch pipe is short in length, the exhaust gas is discharged smoothly, so that the engine performance is enhanced.

Therefore, the functions of the first and second exhaust branch pipes 51, 52 of different lengths make it possible to enhance the engine performance over the wide range of low engine speed to high engine speed.

In addition, in the motorcycle such as an off-road motorcycle, the single-cylinder engine is equipped with the two mufflers, which promises the following effects.

As shown in FIG. 3, the capacity of one muffler is divided into the two mufflers 31, 32, so that each individual muffler of the mufflers 31, 32 is small in size. The reduction in size ensures that the mufflers 31, 32, which are heavy bodies, can be laid out close to the center of gravity (in the vicinity of the engine) of the vehicle body.

Further, the combination of the short first exhaust branch pipe 51 with the second exhaust branch pipe 52, of which the length in the longitudinal direction of the vehicle body is reduced by bending into an S shape, ensures that the mufflers 31, 32 as heavy bodies are laid out close to the center of gravity (in the vicinity of the engine) of the vehicle body.

The second moment of inertia ($GD^2$) is an inertia index used when a heavy body with a weight G is located at a distance D from the center of gravity. As the index is smaller, the mobile body can be rotated or turned more sharply. According to the present invention, the mufflers 31, 32 as heavy bodies can be disposed close to the center of gravity of the vehicle body, so that the second moments of inertia of the mufflers 31, 32 are correspondingly smaller, and the motion performance of the motorcycle is accordingly enhanced.

Incidentally, while the right muffler has been described as the first muffler, the first muffler may be the left muffler. Namely, since the first muffler is on one of the left and right sides and the second muffler is on the other of the left and right sides, the terms first and second have been used. This applies also to the exhaust branch pipes.

In addition, while the present invention is suitable for application to an off-road motorcycle, the invention is applicable also to other motorcycles, particularly motorcycles (inclusive of scooter type vehicles) equipped with a single-cylinder engine.

The present invention is suitably applicable to off-road motorcycles equipped with a single-cylinder engine.

While a working example of the present invention has been described above, the present invention is not limited to the working example described above, but various design alterations may be carried out without departing from the present invention as set forth in the claims.

What is claimed is:

1. A motorcycle comprising:
   a vehicle body comprising a frame;
   an engine operatively attached to the vehicle body,
   a shock absorber operatively attached to the vehicle body behind said engine and proximate a central portion thereof,
   a rear wheel operatively attached to the vehicle body by a swing arm and disposed behind said shock absorber, wherein said rear wheel is rotatably mounted to an end of said swing arm, and swing arm is reciprocally and swingably mounted to said frame by a pivot connection, and an exhaust system comprising a first muffler and a second muffler operatively attached to the vehicle body and disposed respectively on the upper left and right sides of the vehicle body proximate the rear wheel, and an exhaust pipe extending from the engine and connected to said mufflers, wherein:

said exhaust pipe extends from said engine to one of the left and right side of the shock absorber, said exhaust pipe comprises a branched portion in which said exhaust pipe is branched into a first exhaust branch pipe and a second exhaust branch pipe, said branched portion located adjacent to said shock absorber;

said first exhaust branch pipe is connected to said first muffler disposed on the same side of the shock absorber as the exhaust pipe, and said second exhaust branch pipe is connected to said second muffler after passing between said shock absorber and said rear wheel to extend crosswise from one of the left and right sides of said vehicle body to the other of the left and right sides of said vehicle body; wherein the exhaust system is configured and arranged to provide clearance between said branch pipes and said rear wheel, such that during operation of said motorcycle, said rear wheel is capable of swingable movement without contacting said exhaust pipe.

2. A motorcycle as set forth in claim 1, wherein said first exhaust branch pipe is smaller in diameter than said second exhaust branch pipe.

3. A motorcycle as set forth in claim 1, further comprising an air cleaner case disposed between said shock absorber and said rear wheel and above said second exhaust branch pipe, and a cleaner element contained in said air cleaner case and disposed so that the longitudinal direction of the air cleaner case extends in the vehicle width direction.

4. A motorcycle as set forth in claim 1, further comprising an exhaust valve interposed in said branched portion of said exhaust pipe, said exhaust valve being configured so that, when the quantity of the exhaust gas flowing through said exhaust pipe is small, a valve body advances into said exhaust pipe to throttle the flow passages of said first exhaust branch pipe and said second exhaust branch pipe, and, when said quantity of said exhaust gas flowing through said exhaust pipe is large, said valve body recedes from said exhaust pipe to cancel said throttling.

5. A motorcycle as set forth in claim 1, further comprising an exhaust valve interposed in said branched portion of said exhaust pipe, said exhaust valve comprising a valve body, a pocket portion, the pocket portion movably containing the valve body therein, a valve rod which extends from the valve body through the pocket portion, and a spring which biases the valve body towards the inside of the exhaust pipe.

6. A motorcycle as set forth in claim 5, wherein the pocket portion of the exhaust valve is formed by enlarging an inner apex region of the branched portion of said exhaust pipe, such that the pocket portion lies between the first exhaust branch pipe and the second exhaust branch pipe, and wherein the valve body has a pointed peripheral shape.

7. A motorcycle as set forth in claim 1, wherein the second exhaust branch pipe is generally aligned with the direction of gas flow within the exhaust pipe, and wherein the first exhaust branch pipe intersects the exhaust pipe at angle, such that the first exhaust branch pipe is not substantially aligned with the direction of gas flow within the exhaust pipe.

8. A motorcycle as set forth in claim 1, wherein the first exhaust branch pipe and the second exhaust branch pipe are configured so as to substantially equalize the exhaust gas flows between each respective first and second exhaust branch pipe.

9. In a motorcycle of the type having a vehicle body comprising a frame, an engine operatively attached to the vehicle body, a swing arm pivotally and swingably attached to said frame, a shock absorber extending between said swing arm and a portion of said frame a rear wheel operatively attached to the vehicle body by said swing arm and disposed behind said shock absorber, wherein said rear wheel is rotatably mounted to an end of said swing arm behind the engine, the improvement comprising an exhaust system comprising:

a first muffler and a second muffler disposed respectively on the upper left and right sides of the vehicle body proximate the rear wheel, and an exhaust pipe extending from the engine and connected to said mufflers wherein:

said exhaust pipe is branched into a first exhaust branch pipe and a second exhaust branch pipe after extending in the front-rear direction on one side of the vehicle body, said first exhaust branch pipe is connected to said first muffler disposed on the same side of the vehicle as said exhaust pipe, wherein said second exhaust branch pipe is connected to said second muffler after extending crosswise to the side of said vehicle body opposed to said one side; and said second exhaust branch pipe extends in the direction of the exhaust gas flow in said exhaust pipe, and said first exhaust branch pipe extends in a direction which intersects said exhaust gas flow in said exhaust pipe; wherein the exhaust system is configured and arranged to provide clearance between said branch pipes and said rear wheel, such that during operation of said motorcycle, said rear wheel is capable of swingable movement without contacting said exhaust pipe.

10. An exhaust system for a motorcycle as set forth in claim 9, wherein said exhaust pipe comprises a branched portion for branching the exhaust pipe into said first exhaust branch pipe and said second exhaust branch pipe, said branched portion compnsing:

an integrally formed first pipe, and a second pipe, wherein the second pipe has a tip end connected to a wall of said first pipe, an outlet of said second pipe is connected to said first exhaust branch pipe, and an outlet of said first pipe is connected to said second exhaust branch pipe.

11. An exhaust system for a motorcycle as set forth in claim 9, wherein said first exhaust branch pipe is smaller in diameter than said second exhaust branch pipe.

12. An exhaust system for a motorcycle as set forth in claim 9, wherein the exhaust pipe comprises a branched portion for branching the exhaust pipe into said first exhaust branch pipe and said second exhaust branch pipe, and an exhaust valve is interposed in said branched portion, said exhaust valve being configured so that
   when the quantity of the exhaust gas flowing through said exhaust pipe is small, a valve body advances into said exhaust pipe to throttle the flow passages of said first exhaust branch pipe and said second exhaust branch pipe, and,
   when said quantity of said exhaust gas flowing through said exhaust pipe is large,
said valve body recedes from said exhaust pipe to cancel said throttling.

13. An exhaust system for a motorcycle as set forth in claim 9, wherein
the exhaust pipe comprises a branched portion for branching the exhaust pipe into said first exhaust branch pipe and said second exhaust branch pipe, and
an exhaust valve is interposed in said branched portion, said exhaust valve comprising a valve body,
a pocket portion, the pocket portion movably containing the valve body therein,
a valve rod which extends from the valve body through the pocket portion, and
a spring which biases the valve body into the inside of the exhaust pipe.

14. An exhaust system for a motorcycle as set forth in claim 13, wherein the pocket portion of the exhaust valve is formed by enlarging an inner apex region of the branched portion of said exhaust pipe such that the pocket portion lies between the first exhaust branch pipe and the second exhaust branch pipe, and wherein the valve body has a pointed peripheral shape.

15. An exhaust system for a motorcycle as set forth in claim 9, wherein the second exhaust branch pipe is generally aligned with the direction of gas flow within the exhaust pipe, and wherein the first exhaust branch pipe intersects the exhaust pipe at angle such that the first exhaust branch pipe is not aligned with the direction of gas flow within the exhaust pipe.

16. An exhaust system for a motorcycle as set forth in claim 9, wherein the first exhaust branch pipe and the second exhaust branch pipe are configured so as to equalize the exhaust gas flows between each respective first and second exhaust branch pipe.

17. An exhaust system for a motorcycle as set forth in claim 9, wherein the motorcycle further comprises:
a shock absorber disposed between the engine and the rear wheel,
an air cleaner case disposed between said shock absorber and said rear wheel and above said second exhaust branch pipe,
and wherein a cleaner element contained in said air cleaner case is disposed so that the longitudinal direction of the air cleaner case extends in the vehicle width direction.

18. A motorcycle comprising:
a vehicle body;
an engine operatively attached to the vehicle body,
a shock absorber operatively attached to the vehicle body behind said engine and proximate a central portion thereof
a rear wheel operatively attached to the vehicle body and disposed behind said shock absorber, and
an exhaust system comprising
a first muffler and a second muffler operatively attached to the vehicle body and disposed respectively on the upper left and right sides of the vehicle body proximate the rear wheel,
an exhaust pipe extending from the engine and connected to said mufflers, and
an exhaust valve interposed in said exhaust pipe, said exhaust valve comprising a pocket portion formed in a wall of the exhaust pipe and defining a hollow chamber therein, a valve rod which extends from the valve body through the pocket portion, a valve body which is slidably disposed in the pocket portion and affixed to the valve rod, said valve body having a substantially pointed tip portion, and
a spring which biases the valve body towards the inside of the exhaust pipe,
wherein when a quantity of the exhaust gas flowing through said exhaust pipe is small, the valve body advances into said exhaust pipe to throttle the flow passages of said first exhaust branch pipe and said second exhaust branch pipe, the valve body obstructing less than half of the diameter of the exhaust pipe in a fully advanced position thereof,
and when said quantity of said exhaust gas flowing through said exhaust pipe is large, said valve body recedes from said exhaust pipe to reduce said throttling, wherein:
said exhaust pipe extends from said engine to one of the left and right side of the shock absorber,
said exhaust pipe comprises a branched portion in which said exhaust pipe is branched into a first exhaust branch pipe and a second exhaust branch pipe, said branched portion located adjacent to said shock absorber;
said first exhaust branch pipe is connected to said first muffler disposed on the same side of the shock absorber as the exhaust pipe, and
said second exhaust branch pipe is connected to said second muffler after passing between said shock absorber and said rear wheel to extend crosswise from one of the left and right sides of said vehicle body to the other of the left and right sides of said vehicle body.

19. The motorcycle of claim 18, wherein the valve rod includes an enlarged head portion which is disposed outside of the exhaust pipe and which acts as a stop member to limit movement of the valve body into the exhaust pipe.

20. The motorcycle of claim 18, wherein the valve body includes a distal end at the tip portion thereof and a proximal end opposite the distal end and disposed inside of the pocket portion, and wherein the proximal end of the valve body remains inside of the pocket portion in the fully advanced position of the valve body.

\* \* \* \* \*